US008695979B1

(12) United States Patent
Seldin

(10) Patent No.: US 8,695,979 B1
(45) Date of Patent: Apr. 15, 2014

(54) TACTILE AND AUDITORY PUZZLE

(76) Inventor: Edward B. Seldin, Cambridge, MA (US)

( * ) Notice: Subject to any disclaimer, the term of this patent is extended or adjusted under 35 U.S.C. 154(b) by 0 days.

(21) Appl. No.: 13/445,743

(22) Filed: Apr. 12, 2012

(51) Int. Cl.
*A63F 9/08* (2006.01)
*A63B 43/00* (2006.01)

(52) U.S. Cl.
USPC ......... 273/153 R; 473/571; 473/594; 446/419

(58) Field of Classification Search
USPC .......... 273/153 R, 156, 157 R, 146; 473/594, 473/595, 571; 446/297, 419, 421
See application file for complete search history.

(56) References Cited

U.S. PATENT DOCUMENTS

| 149,908 | A | * | 4/1874 | Baldwin | 473/571 |
|---|---|---|---|---|---|
| 530,116 | A | * | 12/1894 | Murphy | 473/571 |
| 973,595 | A | * | 10/1910 | Wahlin | 273/146 |
| 996,458 | A | * | 6/1911 | Coleman | 473/594 |
| 1,593,907 | A | * | 7/1926 | Madan | 273/146 |
| 1,668,143 | A | * | 5/1928 | Daasch | 473/571 |
| 1,709,841 | A | * | 4/1929 | Da Costa | 473/571 |
| 1,789,333 | A | * | 1/1931 | Da Costa | 473/571 |
| 1,800,811 | A | * | 4/1931 | Wolfe | 473/594 |
| 2,003,957 | A | * | 6/1935 | Salisbury | 473/571 |
| 2,301,506 | A | * | 11/1942 | Bean | 473/594 |
| 2,499,483 | A | * | 3/1950 | Foy | 473/594 |
| 2,504,650 | A | * | 4/1950 | Chessrown | 273/155 |
| 2,526,123 | A | * | 10/1950 | Dawson | 273/145 C |
| 2,570,625 | A | * | 10/1951 | Zimmerman et al. | 273/157 R |
| 2,859,968 | A | * | 11/1958 | Modica, Jr. | 473/594 |
| 3,400,932 | A | * | 9/1968 | Conrad | 273/146 |
| 3,954,269 | A | * | 5/1976 | Brittingham | 273/146 |
| 3,995,855 | A | * | 12/1976 | Schultz | 473/594 |
| 4,164,351 | A | * | 8/1979 | Baker | 273/144 B |
| 4,194,737 | A | * | 3/1980 | Farmer | 473/570 |
| 4,244,584 | A | * | 1/1981 | Viveiros | 273/386 |
| 4,261,572 | A | * | 4/1981 | Breinholt | 273/161 |
| 4,300,767 | A | * | 11/1981 | Reed et al. | 473/594 |
| 4,448,418 | A | * | 5/1984 | McNeill | 273/123 A |
| 4,756,530 | A | * | 7/1988 | Karman | 273/113 |
| 5,078,408 | A | * | 1/1992 | Myers | 473/600 |
| 5,131,665 | A | * | 7/1992 | Myers | 473/600 |
| 5,219,162 | A | * | 6/1993 | Orbanes et al. | 473/571 |
| 5,251,908 | A | * | 10/1993 | Myers | 473/607 |
| 5,659,143 | A | * | 8/1997 | Isackson | 446/419 |
| 5,738,560 | A | * | 4/1998 | Bears | 446/220 |
| 5,897,117 | A | * | 4/1999 | Wei | 473/571 |
| 6,056,622 | A | * | 5/2000 | Chung | 446/435 |
| 6,099,376 | A | * | 8/2000 | Singhal et al. | 446/220 |
| 6,390,651 | B2 | * | 5/2002 | Bertrand | 446/220 |
| 6,645,098 | B1 | * | 11/2003 | Quinn | 473/594 |
| 7,045,695 | B1 | * | 5/2006 | Cohen | 446/419 |
| D540,883 | S | * | 4/2007 | Mackenzie | D21/373 |
| 7,296,796 | B2 | * | 11/2007 | Mackenzie | 273/146 |
| D608,840 | S | * | 1/2010 | Crutchfield et al. | D21/373 |

(Continued)

*Primary Examiner* — Steven Wong
(74) *Attorney, Agent, or Firm* — Hayes Soloway P.C.

(57) ABSTRACT

A tactile and auditory puzzle is provided. The tactile and auditory puzzle includes an outer structure, an inner cavity contained within the outer structure, and an object contained within the inner cavity. A tactile and auditory puzzle set includes a plurality of tactile and auditory puzzles. A method of assaying cognitive ability is further provided, including the steps of providing to a user a tactile and auditory puzzle, instructing the user to describe properties of the puzzle, based on auditory and tactile information obtained by manipulating the puzzle, and comparing the user's description with known properties of the puzzle.

12 Claims, 6 Drawing Sheets

(56) References Cited

U.S. PATENT DOCUMENTS 7,910,816 B2 * 3/2011 Glowacki .................. 446/419
D638,070 S * 5/2011 Tyler ........................ D21/372
8,087,671 B2 * 1/2012 Houlis ....................... 273/156
2006/0183401 A1 * 8/2006 Todokoro .................. 446/226

* cited by examiner

TACTILE AND AUDITORY PUZZLE

FIELD OF THE DISCLOSURE

The present disclosure is generally related to puzzles and/or education tools, and more particularly is related to tactile and auditory puzzles and methods of assaying and/or stimulating cognitive ability based on the use of tactile and auditory puzzles. The disclosure will be described in connection with such utility, although other utilities are contemplated.

BACKGROUND OF THE DISCLOSURE

Many types of puzzles and games are known in the prior art. Puzzles are useful as a purely entertainment tool, and also are useful in developing problem solving and analytical skills. Some puzzles are even useful as a tool for measuring or quantifying a person's cognitive abilities.

Most puzzles require the use of vision in order to be solved or advantageously used. However, as a teaching tool, such puzzles are limited in that they only develop, or mostly develop, the user's problem solving and analytical skills in connection with visually perceived information. Moreover, such puzzles and educational tools are not accessible to blind and/or visually impaired individuals.

Thus, a heretofore unaddressed need exists in the industry to address the aforementioned deficiencies and inadequacies.

SUMMARY OF THE DISCLOSURE

Embodiments of the present disclosure provide a tactile and auditory puzzle and a method of assaying cognitive ability. Briefly described, one embodiment of the tactile and auditory puzzle, among others, can be implemented as follows. The tactile and auditory puzzle includes an outer structure, an inner cavity contained within the outer structure, and an object contained within the inner cavity.

In another embodiment, a tactile and auditory puzzle set is provided that includes a plurality of tactile and auditory puzzles, each of said tactile and auditory puzzles comprising: an outer structure; an inner cavity contained within the outer structure; and an object contained within the inner cavity.

In yet another embodiment, a method of assaying cognitive ability is provided that includes the steps of: providing to a user a puzzle having an outer structure, an inner cavity contained within the outer structure, and an object contained within the inner cavity; instructing the user to describe, based on auditory and tactile information obtained by manipulating the puzzle, at least one of the shape of the inner cavity and the shape of the object; and comparing the user's description with known properties of at least one of the inner cavity and the object.

Other systems, methods, features, and advantages of the present disclosure will be or become apparent upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1A:
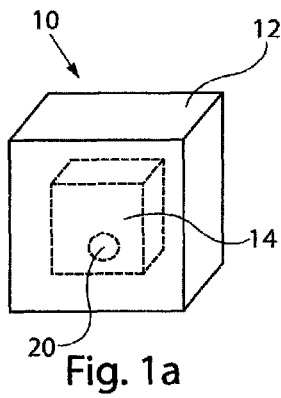
FIGS. 1a-1e are schematic illustrations of various configurations of tactile and auditory puzzles, in accordance with a first exemplary embodiment of the present disclosure.
Figure 1B:
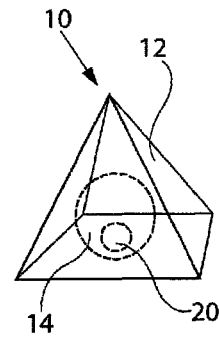
Figure 1C:
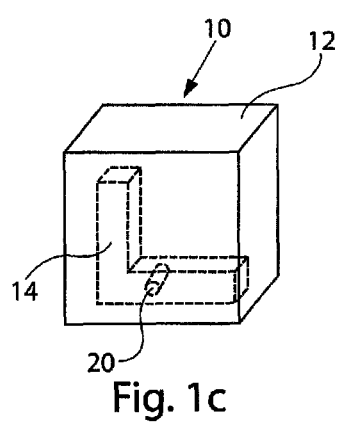
Figure 1D:
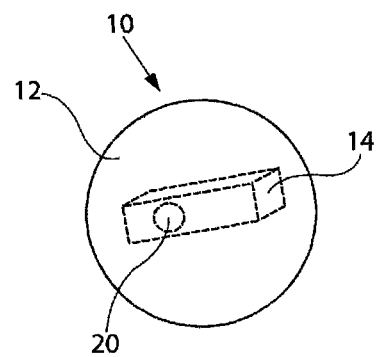

In the following description, reference is made to the accompanying drawings, which form a part hereof, and in which is shown, by way of illustration, various embodiments of the present disclosure. It is understood that other embodiments may be utilized and changes may be made without departing from the scope of the present disclosure.

FIG. 1 is a schematic illustration of a tactile and auditory puzzle 10, in accordance with a first exemplary embodiment of the present disclosure. The puzzle 10 includes an outer structure 12, an inner cavity 14 and one or more objects 20, contained within the inner cavity 14.

The outer structure 12 may be formed of any material, including, for example, acrylic, plastics, thermoplastics or other such polymeric material, metals, wood, cardboard, and so on. Preferably, the outer structure 12 is non-transparent, such that the inner cavity 14 is not visible through the outer structure 12. The outer structure 12 may be coated, for example with a non-transparent or substantially non-transparent coating, such as paint.

The outer structure 12 may be any shape. As shown in FIGS. 1a, 1b, 1c and 1d, the outer structure 12 may have the shape of a cuboid (i.e., any rectangular prism, such as a cube) (FIGS. 1a, 1c), a pyramid (FIG. 1b), a sphere (FIG. 1d) or any other three-dimensional shape. In a set of such puzzles, the external shapes may all be the same or may differ in shape or texture as an aid to the visually impaired in being able to return to a previously inspected box for comparison/contract with a subsequent box as regards tactile and sound signatures. The inner cavity 14 is completely bounded by, and contained within, the outer structure 20. Like the outer structure 12, the inner cavity 14 may be of any three-dimensional shape, including a cuboid (e.g., FIG. 1a), a sphere (e.g., FIG. 1b), an "L" shape (e.g., FIG. 1c), a thin cube or segment of a cube (e.g., FIG. d), a disk, a rectangular or triangular shape, a cylinder, a ring, torus or any other shape. The inner cavity 14 may be a cavity or a void formed directly within the outer structure 12.

An object 20 is contained within the inner cavity 14. The object may be an object of any three-dimensional shape, including spheres, cubes, pyramids, cones, rods, rings, disks, and so on. The object 20 may be made of any material, including glass, plastic, wood, metals and so on. The object 20 is capable of movement within the inner cavity 14, and preferably produces a unique sound signal when moved internally in the outer structure. More than one object 20 may be included within the inner cavity 14.

Inner cavities may be largely planar or may be three dimensional, e.g.: a spherical cavity or a flat round cavity.

Figure 1E:
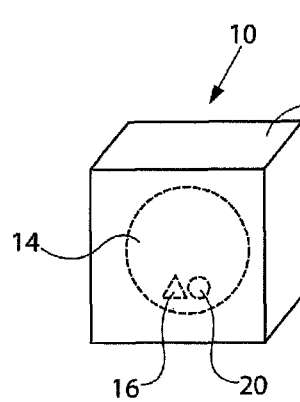

As shown in FIG. 1e, an inner structure 16 may be included within, or as part of, the inner cavity 14. For example, as shown in FIG. 1e, the inner cavity 14 may be a circular or disk shape, and a ramp may be included as an inner structure 16. The inner structure 16 may be composed of the same material as the outer structure 12, and in fact may be an extension of the outer structure 12 into the otherwise circular or disk shaped inner cavity 14. The inner structure 16 may impede the movement of the object 20. For example, as shown in FIG. 1e, the inner structure 16 may prevent or impede the object 20 from moving to the left, from the position as shown. However, the object 20 could move over the ramp 16 if approaching the ramp 16 from the opposite direction, i.e. from the left of the ramp 16.

Figure 2:
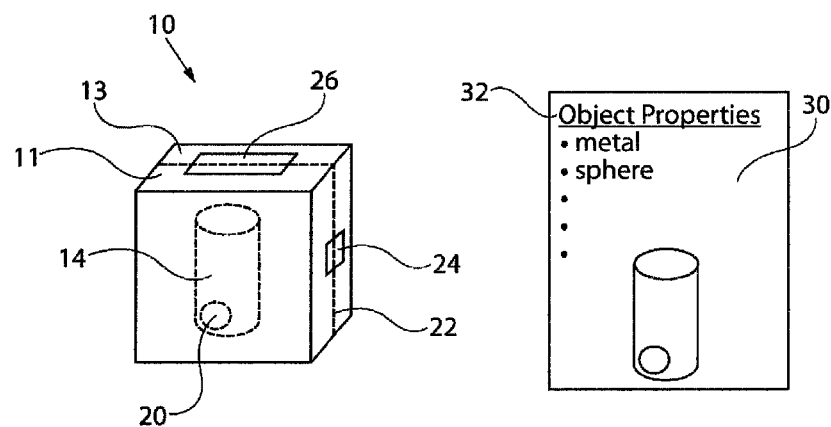
FIG. 2 is a schematic illustration of a tactile and auditory puzzle including a key and other features, in accordance with a further aspect of the present disclosure.

As shown in FIG. 2 the puzzle 10 may further include a key 30. The key 30 may provide a diagram or illustration of the shape of the inner cavity 14, as well as the shape of the object 20. The key 30 may further include a list 32 which may describe properties of the inner cavity 14 and/or the object 20. For example, the list 32 may specify that the object 20 is a metal sphere. The key 30 allows a user to compare his/her analysis and determinations as to the properties of the inner cavity 14 and/or object 20 with the actual characteristics. Additionally, or alternatively, the outer structure 12 may include two or more separable pieces 11, 13, such that the puzzle may be taken apart, thereby allowing the inner cavity 14 and object 20 to be viewed. While opening of the cavity may be an allowable option, there may be good reasons having to do with the use of such puzzles, to present the boxes as permanently sealed entities. The pieces 11, 13 may be separable about a plane 22. When the pieces 11, 13 are put together, forming a completed puzzle 10, the pieces 11, 13 may be secured by one or more attachment members 24. The attachment members 24 may be any type of attachment member capable of securing the pieces 11, 13 of the outer structure 12. For example, the attachment members 24 may include snap-fit type fasteners, hook-and-look fasteners, buckles, clamps, clips, and the like. The pieces 11, 13 may further be secured by, and separable about, a hinge 26.

Figure 3:
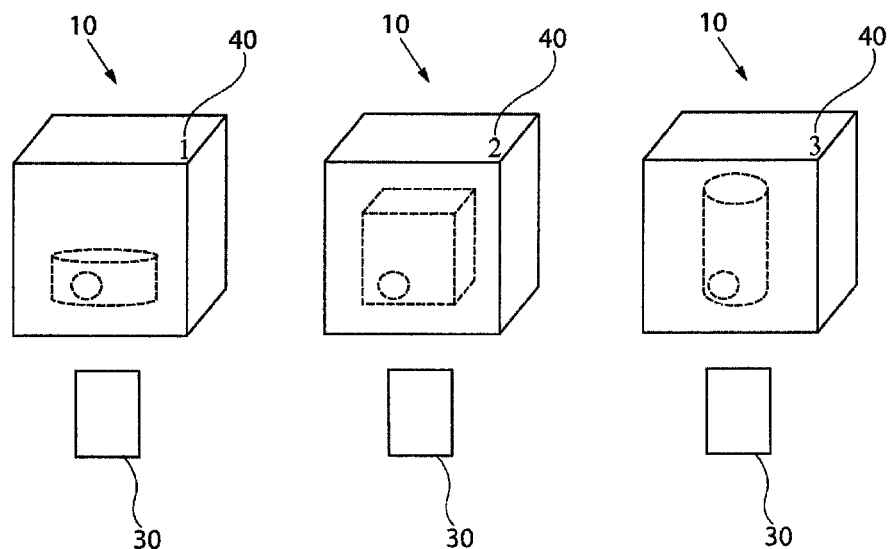
FIG. 3 is a schematic illustration of a tactile and auditory puzzle set, in accordance with a further embodiment of the present disclosure.

FIG. 3 schematically illustrates a tactile and auditory puzzle set 200. The puzzle set 200 includes a plurality of tactile and auditory puzzles 10. Each of the puzzles 10 within the puzzle set 200 may include an identifier 40, which identifies the particular puzzle 10 within the puzzle set 200. The identifier 40 may be a number, for example as shown in FIG. 3. The identifiers 40 may be sequential, with each successive identifier in the sequence denoting increasing difficulty of the puzzles 10. The puzzle set 200 may further include a plurality of keys 30, one for each puzzle 10 within the set 200.

In use, an object of the tactile and auditory puzzle 10 is to determine and identify the shape of the inner cavity 14, as well as the shape of the object 20 contained within the inner cavity 14. Further, it may be an object of the tactile and auditory puzzle 10 to identify some material properties (e.g., glass, metal, plastic, etc.) of the object 20. Because the outer structure 12 of the auditory and tactile puzzle 10 is non-transparent, a user must rely exclusively on tactile and auditory information obtained, for example, by manipulating the puzzle 10, in order to identify properties of the inner cavity 14 and the object 20. By manipulating the puzzle 10, for example by rotating or shaking the puzzle 10, the object 20 may be used as a "probe" of the cavity 14, thereby providing clues (via auditory and tactile information) as to the shape and character of both the cavity 14 and the object 20. Thus, the puzzle 10 can be viewed as, or employed as, a game, a puzzle or as a method for assaying cognitive ability that relies upon non-visual sensory inputs. In addition, the auditory and tactile puzzle 10 may be used as an exercise to foster, build, study or assess group problem-solving behavior, group dynamics and/or the optimal organization of a group to effectively engage in collective problem solving. Thus, the puzzle 10 may be viewed as an education tool with many potential applications.

The tactile and auditory puzzles 10 may thus be used not only as puzzles or games, but will further advantageously be used by teachers, guidance counselors, psychologists and individuals involved in special education. Moreover, the tactile and auditory puzzles 10 may be particularly useful within the context of education for the blind or visually-impaired, due to its exclusive reliance on non-visual cues.

The use of the tactile and auditory puzzles 10, for example as a learning tool, may be wholly independent of time, or elapsed time may be measured and used to quantify the user's performance, along with the user's accuracy in identifying the characteristics of the inner cavity 14 and/or the object 20. Additionally or alternatively, a "time pressure" may be introduced in an exercise by allowing only a finite amount of time for completion of the task of identifying characteristics of the inner cavity 14 and/or object 20.

FIGS. 4a-4m illustrate various other non-limiting embodiments of the disclosure.

Figure 4A:
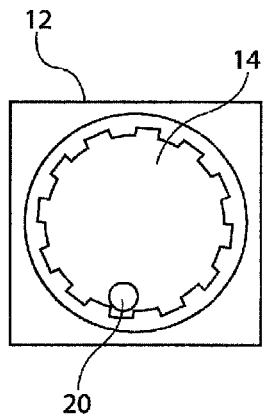
FIGS. 4a-4m are schematic illustrations of various other embodiments of the present disclosure.

FIG. 4a illustrates a round cavity with toothed perimeter. Moving the ball makes a course, clicking vibration.

Figure 4B:
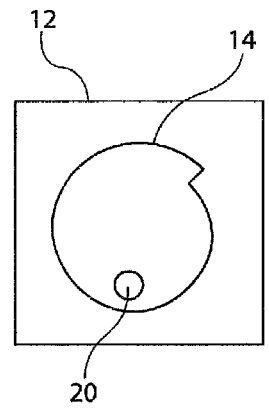

FIG. 4b illustrates a round cavity with step wedge. The ball rotates with a click in one direction and its path is interrupted in the opposite direction.

Figure 4C:
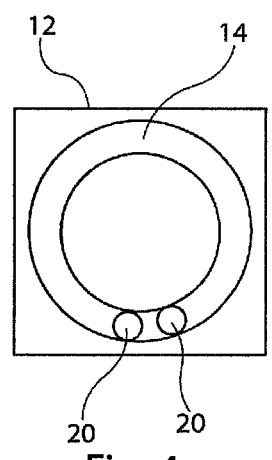

FIG. 4c illustrates a ring instead of an open circle with two steel balls. Rotation is free so the balls can be made to collide with a distinctive sound signature. In contradistinction to an open circle, balls cannot be made to roll cross-wise.

Figure 4D:
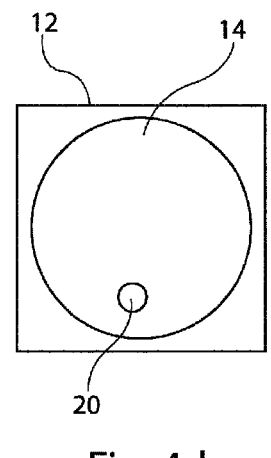

FIG. 4d illustrates a round cavity with a steel ball.

Figure 4E:
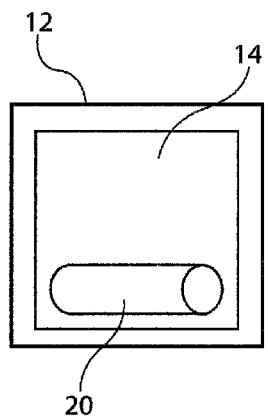

FIG. 4e illustrates a square cavity with steel cylinder. The cylinder rolls radially, slides axially or, with an end in a corner of the cylinder will slide from one wall to an adjacent wall.

Figure 4F:
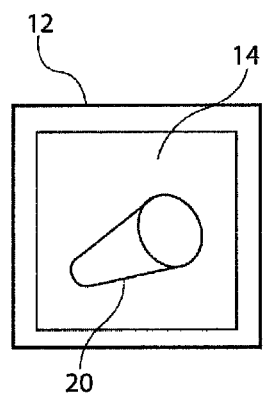

FIG. 4f illustrates a square cavity with a conical steel roller. The cone will not roll between opposite sides but rolls from one side to an adjacent side by way of contrast with a cylindrical roller.

Figure 4G:
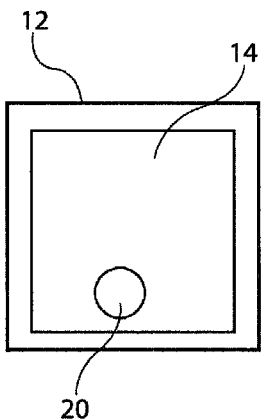

FIG. 4g illustrates a square cavity with a steel ball.

Figure 4H:
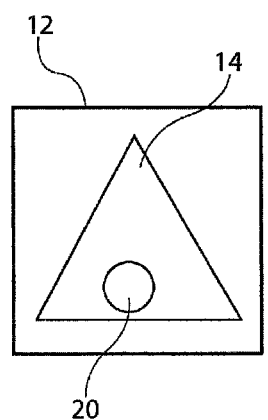

FIG. 4h illustrates a triangular cavity with a steel ball.

Figure 4I:
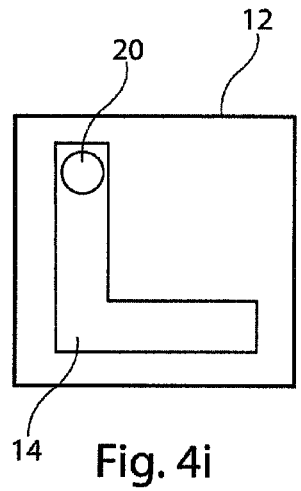

FIG. 4i illustrates an "L"-shaped cavity with a steel ball. The ball rolls from end to end. when the box is turned end-for-end but only when either of two adjacent sides of the four sides are uppermost.

Figure 4J:
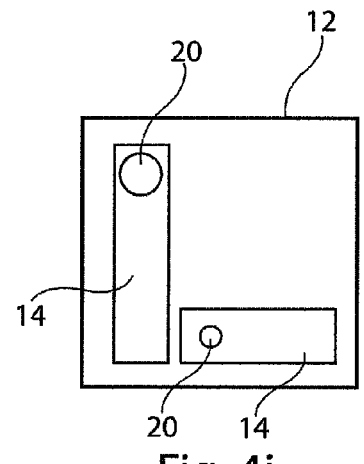

FIG. 4j illustrates two linear enclosures at right angles, similar to the "L" shaped cavity. One cavity has a steel ball the other a small glass marble. The two types of balls have different sound signatures even though the overall dynamic is similar to the "L".

Figure 4K:
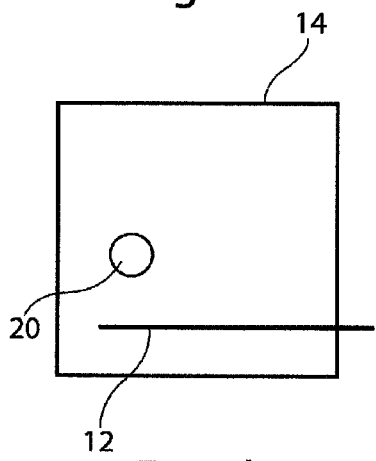

FIG. 4k illustrates a square cavity with one wall formed by a spring steel rod mounted at one end with a steel ball. The ball makes a musical note when it strikes the rod, which is louder at free end of rod then at the fixed end.

Figure 4L:
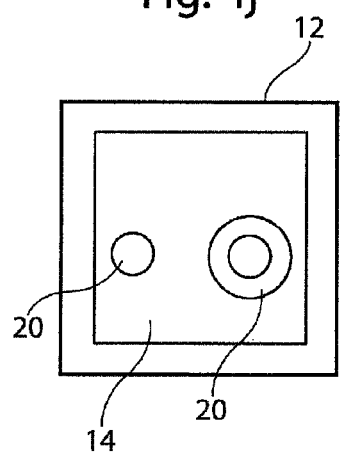

FIG. 4l illustrates a square cavity with steel ball and a large steel washer. The ball rolls as it does in the square cavity. The washer slides within the cavity. With one corner tilted downwards, the ball becomes trapped in the hole of the washer with a constrained, short path of motion and a distinct sound signature.

Figure 4M:
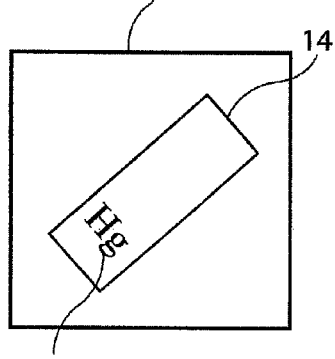

FIG. 4m illustrates an elongate cavity with liquid mercury therein. Manipulating the puzzle causes a change in the center of gravity, without making a noise.

Figure 5:
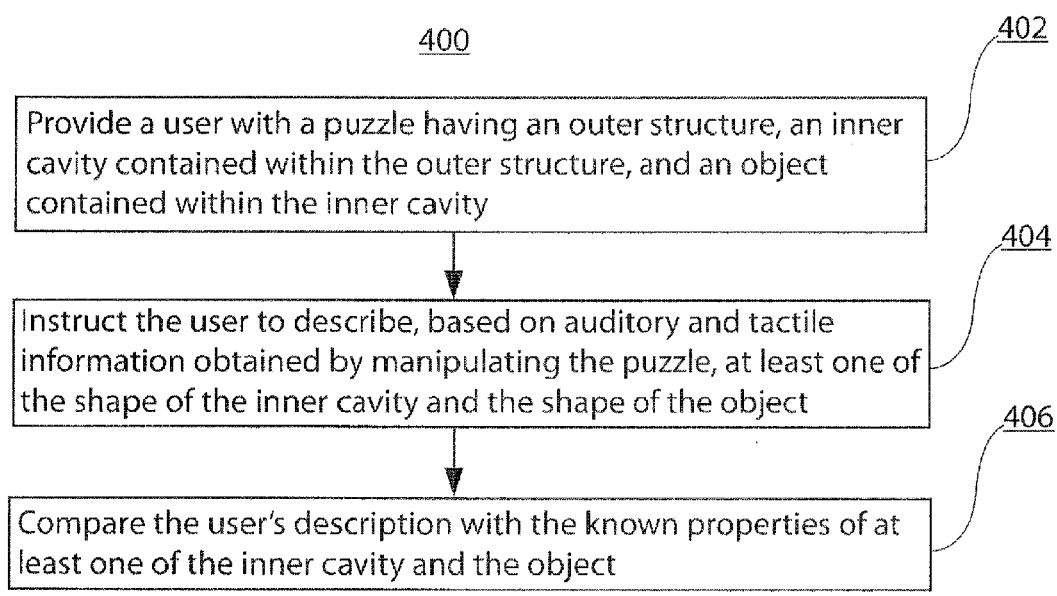
FIG. 5 is a flowchart illustrating a method of assaying cognitive ability, in accordance with yet another embodiment of the present disclosure.

FIG. 5 is a flowchart illustrating a method of assaying cognitive ability 400. It should be noted that any process descriptions or blocks in flow charts should be understood as representing modules, segments, portions of code, or steps that may include one or more instructions for implementing specific logical functions in the process, and alternate implementations are included within the scope of the present disclosure in which functions may be executed out of order from that shown or discussed, including substantially concurrently or in reverse order, depending on the functionality involved.

As is shown by block 402, a user is provided a puzzle 10 having an outer structure 12, an inner cavity 14 contained within the outer structure 12, and an object 20 contained within the inner cavity 14. At block 404, the user is instructed to describe, based on auditory and tactile information obtained by manipulating the puzzle 10, at least one of the shape of the inner cavity 14 and the shape of the object 20. The puzzle 10 may be manipulated by physically moving, e.g., rotating or shaking, the puzzle 10 and listening to auditory clues and feeling tactile clues produced by the movements of the object 20 within the inner cavity 14 due to the force of gravity or due to the inertia of the movable object as the user tilts, rotates or swirls the puzzle in his hands or in contact with a table or work surface. Types of motion of internal objects that may be associated with unique and diagnostically useful forms of manipulation of the puzzles will include: 1. Rolling motion, as of a sphere, cylinder or cone; 2. Sliding motion; 3. Tumbling motion; 4. Collision between object and cavity wall or two moving objects within the cavity; 5. Motion of Particulate materials such as sand or multiple metallic spheres, cubes or other shaped objects; and 6. Motion of fluid substances. At block 406, the user's description is compared with known properties of at least one of the inner cavity 14 and the object 20. The known properties may be obtained, for example, from a key 30. A time limit may be provided within which the user must describe at least one of the shape of the inner cavity 14 and the shape of the object 20, and an amount of time elapsed during performance of the method may be measured.

It is to be understood that, notwithstanding the generality required of disclosures to maximize coverage, there may be practical reasons for constricting embodiments so as to optimize utility in a specific setting or with a specific end in mind. The end of producing a puzzle that is solvable and of maximal education or testing value may require the imposition of order and limits on a chosen embodiment. Thus, the present disclosure permits the development of statistics (norms) on subject performance when a set of such puzzles is used in conjunction with a standardized testing protocol and milieu. The disclosure also may be used for testing individuals or groups of individuals engaged in a group problem-solving exercise and/or employed in post-test debriefing materials to enhance comprehension.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A tactile and auditory puzzle set comprising:
   a plurality of tactile and auditory puzzles, each of said tactile and auditory puzzles comprising:
   an outer structure formed of a non-transparent material, and having a first three-dimensional shape;
   an inner cavity contained within the outer structure and having a second three-dimensional shape different from the first three-dimensional shape;
   one or more objects contained within the inner cavity, wherein the inner cavity comprises at least one of the shapes selected from the group consisting of a cube shape, a spherical shape, a pyramid shape, an "L" shape, a cylindrical shape, a cone shape, a disk shape, a ring shape, a torus shape and a triangular shape, and wherein the object or objects produces a unique sound signature when moved in the inner cavity; and
   a plurality of keys, one for each of said plurality of tactile and auditory puzzles, wherein the keys comprise illustrations of the shape of at least one of the inner cavity and the object for each respective tactile and auditory puzzles, wherein the shape of at least one of the inner cavity and the object for each tactile and auditory puzzle is different.

2. The puzzle of claim 1, wherein at least one outer structure has a cuboid shape.

3. The puzzle of 1, wherein at least one object comprises at least one of glass, plastic, wood and metal.

4. The puzzle of 1, wherein at least one object comprises at least one of the following shapes: a cube, a sphere, a pyramid, a cone, a rod, a ring, a disk and a torus.

5. The puzzle of claim 1, wherein a plurality of objects are contained within at least one inner cavity.

6. The puzzle of claim 1, wherein the key further comprises descriptive information regarding properties of at least one of the inner cavity and the object.

7. The puzzle of claim 1, wherein at least one outer structure comprises at least two detachable pieces.

8. The puzzle of claim 7, further comprising an attachment member for attaching the at least two detachable pieces.

9. A method of assaying cognitive ability, comprising the steps of:
   providing to a user a puzzle as claimed in claim 1, having an outer structure, an inner cavity contained within the outer structure, and one or more objects which produces unique sound signature when moved in the inner cavity, contained within the inner cavity;
   instructing the user to describe, based on auditory and tactile information obtained by manipulating the puzzle, at least one of the shape of the inner cavity and the shape of the object; and
   comparing the user's description with known properties of at least one of the inner cavity and the object.

10. The method of claim 9, further comprising the step of:
    providing a time limit within which the user must describe at least one of the shape of the inner cavity and the shape of the object.

11. The method of claim 10, further comprising the step of:
    measuring an amount of time elapsed during performance of the method.

12. The puzzle set of claim 1, wherein each of said plurality of tactile and auditory puzzles is marked with a unique identifier.

* * * * *